United States Patent
Lagun et al.

(10) Patent No.: US 12,135,974 B1
(45) Date of Patent: Nov. 5, 2024

(54) USING CUSTOM TEMPLATES TO DEFINE NEW SYSTEM TYPES FOR INSTANTIATION

(71) Applicant: Styra, Inc., Redwood City, CA (US)

(72) Inventors: Stan Lagun, San Jose, CA (US); Timothy L. Hinrichs, Los Altos, CA (US); Teemu Koponen, San Francisco, CA (US)

(73) Assignee: STYRA, INC., Redwood City, CA (US)

( * ) Notice: Subject to any disclaimer, the term of this patent is extended or adjusted under 35 U.S.C. 154(b) by 93 days.

(21) Appl. No.: 17/955,507

(22) Filed: Sep. 28, 2022

Related U.S. Application Data

(60) Provisional application No. 63/250,178, filed on Sep. 29, 2021.

(51) Int. Cl.
*G06F 9/445* (2018.01)

(52) U.S. Cl.
CPC ................................ *G06F 9/44505* (2013.01)

(58) Field of Classification Search
CPC .................................................. G06F 9/44505
See application file for complete search history.

(56) References Cited

U.S. PATENT DOCUMENTS

| | | | |
|---|---|---|---|
| 5,974,549 A | 10/1999 | Golan | |
| 6,985,953 B1 | 1/2006 | Sandhu et al. | |
| 7,043,659 B1 | 5/2006 | Klein et al. | |
| 7,096,367 B2 | 8/2006 | Garg et al. | |
| 7,124,192 B2 | 10/2006 | High, Jr. et al. | |
| 7,752,661 B2 | 7/2010 | Hemsath et al. | |
| 7,913,300 B1 | 3/2011 | Flank et al. | |
| 8,266,694 B1 | 9/2012 | Roy | |
| 8,613,070 B1 | 12/2013 | Borzycki et al. | |
| 8,683,560 B1 | 3/2014 | Brooker et al. | |
| 8,789,138 B2 | 7/2014 | Reierson et al. | |
| 9,397,990 B1 | 7/2016 | Taly et al. | |
| 9,530,020 B2 | 12/2016 | Brandwine et al. | |
| 9,648,040 B1 | 5/2017 | Morkel et al. | |
| 10,122,757 B1 | 11/2018 | Kruse et al. | |
| 10,127,393 B2 | 11/2018 | Ferraiolo et al. | |
| 10,182,129 B1 | 1/2019 | Peterson et al. | |
| 10,257,184 B1 | 4/2019 | Mehta et al. | |
| 10,353,726 B2 | 7/2019 | Duan | |
| 10,454,975 B1 | 10/2019 | Mehr | |

(Continued)

OTHER PUBLICATIONS

Author Unknown, "API Best Practices Managing the API Lifecycle: Design, Delivery, and Everything in Between," Dec. 2016, 37 pages, Apigee, retrieved from https://pages.apigee.com/rs/351-WXY-166/images/API-Best-Practices-ebook-2016-12.pdf.

(Continued)

*Primary Examiner* — Faisal M Zaman
(74) *Attorney, Agent, or Firm* — ADELI LLP

(57) ABSTRACT

Some embodiments of the invention provide a method for generating custom system templates to define new system types. For a particular system type, the method defines at least a manifest file that specifies a set of properties of the particular system type. The method compresses the defined manifest file to create a custom system template package for the particular system type. The method uploads the custom system template package to an authorization service in order to instantiate a new system of the particular system type.

18 Claims, 9 Drawing Sheets

(56) References Cited

U.S. PATENT DOCUMENTS

| | | | |
|---|---|---|---|
| 10,469,314 B2 | 11/2019 | Ennis, Jr. et al. | |
| 10,574,699 B1 | 2/2020 | Baer et al. | |
| 10,592,302 B1 | 3/2020 | Hinrichs et al. | |
| 10,592,683 B1 | 3/2020 | Lim et al. | |
| 10,715,514 B1 | 7/2020 | Threlkeld | |
| 10,719,373 B1 | 7/2020 | Koponen et al. | |
| 10,740,470 B2 | 8/2020 | Ionescu et al. | |
| 10,789,220 B2 | 9/2020 | Mayer et al. | |
| 10,984,133 B1 | 4/2021 | Hinrichs et al. | |
| 10,986,131 B1 | 4/2021 | Kruse et al. | |
| 10,990,702 B1 | 4/2021 | Hinrichs et al. | |
| 11,023,292 B1 | 6/2021 | Hinrichs et al. | |
| 11,080,410 B1 | 8/2021 | Sandall et al. | |
| 11,108,827 B2 | 8/2021 | Beckman et al. | |
| 11,108,828 B1 | 8/2021 | Curtis et al. | |
| 11,170,099 B1 | 11/2021 | Sandall et al. | |
| 11,228,573 B1 | 1/2022 | Rangasamy et al. | |
| 11,245,728 B1 | 2/2022 | Curtis et al. | |
| 11,258,824 B1 | 2/2022 | Hinrichs et al. | |
| 11,327,815 B1 | 5/2022 | Koponen et al. | |
| 11,470,121 B1 | 10/2022 | Curtis et al. | |
| 11,477,238 B1 | 10/2022 | Curtis et al. | |
| 11,477,239 B1 | 10/2022 | Curtis et al. | |
| 11,494,518 B1 | 11/2022 | Curtis et al. | |
| 11,496,517 B1 | 11/2022 | Hinrichs et al. | |
| 11,502,992 B1 | 11/2022 | Koponen et al. | |
| 11,513,778 B1 | 11/2022 | Graves et al. | |
| 11,516,253 B1 | 11/2022 | Van Deman et al. | |
| 11,520,579 B1 | 12/2022 | Narkar et al. | |
| 11,604,684 B1 | 3/2023 | Hinrichs et al. | |
| 11,681,568 B1 | 6/2023 | Hinrichs et al. | |
| 2004/0025004 A1* | 2/2004 | Gorday | G06F 15/7867 713/100 |
| 2004/0083367 A1 | 4/2004 | Garg et al. | |
| 2007/0156670 A1 | 7/2007 | Lim | |
| 2008/0184336 A1 | 7/2008 | Sarukkai et al. | |
| 2009/0063665 A1 | 3/2009 | Bagepalli et al. | |
| 2009/0077618 A1 | 3/2009 | Pearce et al. | |
| 2009/0281996 A1 | 11/2009 | Liu et al. | |
| 2010/0281462 A1 | 11/2010 | Festa | |
| 2010/0333079 A1 | 12/2010 | Sverdlov et al. | |
| 2011/0113484 A1 | 5/2011 | Zeuthen | |
| 2012/0030354 A1 | 2/2012 | Razzaq et al. | |
| 2012/0117608 A1 | 5/2012 | Metke et al. | |
| 2012/0144295 A1 | 6/2012 | Clark et al. | |
| 2012/0311672 A1 | 12/2012 | Connor et al. | |
| 2012/0331539 A1 | 12/2012 | Matsugashita | |
| 2013/0226970 A1 | 8/2013 | Weber et al. | |
| 2013/0305039 A1* | 11/2013 | Gauda | G06F 21/6272 713/153 |
| 2014/0032691 A1 | 1/2014 | Barton et al. | |
| 2014/0032759 A1 | 1/2014 | Barton et al. | |
| 2014/0033267 A1 | 1/2014 | Aciicmez | |
| 2014/0237594 A1 | 8/2014 | Thakadu et al. | |
| 2015/0089575 A1 | 3/2015 | Vepa et al. | |
| 2015/0227354 A1* | 8/2015 | Wang | G06F 8/65 717/169 |
| 2015/0244724 A1 | 8/2015 | Xu et al. | |
| 2016/0057107 A1 | 2/2016 | Call et al. | |
| 2016/0110183 A1* | 4/2016 | Fu | G06F 8/63 717/169 |
| 2016/0188898 A1 | 6/2016 | Karinta et al. | |
| 2017/0111336 A1 | 4/2017 | Davis et al. | |
| 2017/0161120 A1 | 6/2017 | Sasaki et al. | |
| 2017/0220370 A1 | 8/2017 | Klompje et al. | |
| 2017/0237729 A1 | 8/2017 | Uppalapati | |
| 2017/0346807 A1 | 11/2017 | Blasi | |
| 2017/0364702 A1 | 12/2017 | Goldfarb et al. | |
| 2018/0067790 A1 | 3/2018 | Chheda et al. | |
| 2018/0082053 A1 | 3/2018 | Brown et al. | |
| 2018/0109538 A1 | 4/2018 | Kumar et al. | |
| 2018/0309746 A1 | 10/2018 | Blasi | |
| 2019/0007418 A1 | 1/2019 | Cook et al. | |
| 2019/0007443 A1 | 1/2019 | Cook et al. | |
| 2019/0080103 A1 | 3/2019 | Hadzic et al. | |
| 2019/0081862 A1* | 3/2019 | Lockhart | H04L 41/0889 |
| 2019/0230130 A1 | 7/2019 | Beckman et al. | |
| 2019/0236975 A1 | 8/2019 | Chong et al. | |
| 2019/0245862 A1 | 8/2019 | Kruse et al. | |
| 2019/0268218 A1* | 8/2019 | Thomasson | H04L 41/0879 |
| 2019/0273746 A1 | 9/2019 | Coffing | |
| 2019/0386973 A1 | 12/2019 | Patwardhan et al. | |
| 2020/0007580 A1 | 1/2020 | Liderman et al. | |
| 2020/0036723 A1* | 1/2020 | Ranchod | G06F 8/60 |
| 2021/0029029 A1 | 1/2021 | Mehmedagic et al. | |
| 2021/0240550 A1 | 8/2021 | Hinrichs et al. | |
| 2021/0248017 A1 | 8/2021 | Hinrichs et al. | |
| 2021/0365571 A1 | 11/2021 | Sandall et al. | |
| 2022/0269549 A1 | 8/2022 | Koponen et al. | |
| 2022/0337417 A1* | 10/2022 | Sanders | H04L 9/0643 |
| 2023/0214358 A1* | 7/2023 | Liu | H04L 69/04 707/693 |

OTHER PUBLICATIONS

Costa, Jeff, "Improve API Performance with Caching," API Gateway, May 3, 2018, 18 pages, Akamai Developer, retrieved from https://developer.akamai.com/blog/2018/05/31/improve-api-performance-caching.

Non-Published commonly Owned U.S. Appl. No. 16/050,119, filed Jul. 31, 2018, 55 pages, Styra, Inc.

Non-Published commonly Owned U.S. Appl. No. 16/050,143, filed Jul. 31, 2018, 56 pages, Styra, Inc.

Win, Thu Yein, et al., "Virtualization Security Combining Mandatory Access Control and Virtual Machine Introspection," 2014 IEEE/ACM 7th International Conference on Utility and Cloud Computing, Dec. 8-11, 2014, 6 pages, IEEE, London, UK.

Moffett, Jonathan D., et al., "Policy Hierarchies for Distributed Systems Management," IEEE Journal on Selected Areas in Communications, Dec. 1993, 11 pages, vol. 11, IEEE, USA.

Non-Published commonly Owned U.S. Appl. No. 18/120,810, filed Mar. 13, 2023, 63 pages, Styra, Inc.

* cited by examiner

```
                                                          500
510 ─── tokens:
        ─ installtoken:
            description: token for user to download OPA configuration
            ttl: 24h        # 24h is the default
            scopes:
520         - assets
        ─ opatoken:
            description: permanent token for OPA to contact DAS
            ttl: 87600h
            scopes:
            - discovery
            - status
            - bundles
530         - logs
        ─ anothertoken:
            description: a token with administrative rights
            ttl: 1h
            path:           # optional, defaults to [".*"]
            - .*
```

*Figure 5*

```
                                                          600
install:
  - category: Helm     # the human-readable name that appears in the install tab in the GUI
    steps:
    - title: download values file
      action: "curl -H 'Authorization: Bearer {{token \"install\"}}' -o values.yaml {{asset \"values
```

*Figure 6*

| Scope | Corresponding API path regex |
|---|---|
| all | .* |
| discovery | ^/systems/ID/discovery$ |
| status | ^/status($\|/) |
| bundles | ^/bundles/systems/ID$ |
| logs | ^/logs($\|/) |
| system | ^/systems/ID($\|/) |
| assets | ^/systems/ID/assets/ |
| stack | ^/stacks/ID($\|/) |
| workspace | ^/workspace($\|/) |
| data | ^/data($\|/) |
| policies | ^/policies($\|/) |
| datasources | ^/datasources/systems/ID($\|/) |
| logreplay | ^/logreplay$ |
| decisions | ^/decisions$ |
| agents | ^/agents($\|/) |
| notifications | ^/notifications/ |
| notifications-install | ^/notifications-install/ |

*Figure 7*

```
discovery:
  defaultRule: package/main
  omitPaths:
    - datasetId1
    - datasetId2
  eval: policy["com.styra.envoy"].resolver.main
extra:
  plugins:
    envoy_ext_authz_grpc:
      addr: 127.0.0.1:9191
      path: policy/com.styra.envoy/resolver/main
      dry-run: false
```

```
"template.packageId:1.2": {
  "kind": "SystemTemplate",
  "apiVersion": "1.0.0",
  "title": " ... ",
  "name": "test",
  "version": "1.2.4",
  "parameters": {
    "system": [
      {
        "group": "test",
        "parameters": [
          {
            "name": "intp",
            "type": "integer",
            "validation": "1"
          }
        ]
      }
    ],
    "stack": [
      ...
    ],
    "deployment": [
      ...
    ]
  },
  "prototype": "kubernetes:v2",
  "allowUserContent": true,
  "stacks": true,
  "package": "https://test.styra.com/v1/system-types/template.packageId:1.2.3?package",
  "logo": " ... "
},
```

```
List available system types
`GET /v1/system-types`
```json
{
  "result": {
    "kubernetes:v2": {
      "name": "kubernetes",
      "version": "2.0.0",
      "title": "Kubernetes",
      "parameters": { ... },
      "stacks": true,
      "allowUserContent": false
    },
    "envoy": {
      "name": "envoy",
      "version": "1.0.0",
      "title": "Envoy",
      "parameters": { ... },
      "allowUserContent": false,
      "stacks": true
    },
    "custom": {
      "name": "custom",
      "version": "1.0.0",
      "title": "Custom",
      "parameters": {
      },
      "allowUserContent": true,
      "stacks": false
    },
```

*Figure 13*

USING CUSTOM TEMPLATES TO DEFINE NEW SYSTEM TYPES FOR INSTANTIATION

CLAIM OF BENEFIT TO PRIOR APPLICATIONS

This application claims the benefit of U.S. Provisional Patent Application No. 63/250,178, titled "Using Custom Templates to Define New System Types for Instantiation" and filed on Sep. 29, 2021. U.S. Provisional Patent Application No. 63/250,178 is incorporated herein by reference.

BACKGROUND

Today, system types include small numbers of predefined system types, and custom types for everything else. The predefined types target specific use cases and are not suitable for use cases outside of those specific targets. Conversely, the custom type is generic and requires users (e.g., network administrators) to write everything from scratch. While templated types are not as powerful as manually crafted predefined types, especially on the UI front, these templated types are much more flexible than the custom system type.

BRIEF SUMMARY

Some embodiments of the invention provide a method for generating custom system templates to define new system types. For a particular system type, the method defines at least a manifest file that specifies a set of properties of the particular system type. The method then compresses the defined manifest file (e.g., into a gzip file) to create a custom system template package for the particular system type. The method then uploads the custom system template package to an authorization service in order to instantiate a new system of the particular system type.

In some embodiments, before compressing the defined manifest file, a system-type logo associated with the particular system type, a first policies folder that includes multiple default policies associated with the particular system type, a second policies folder that includes multiple policies specified for the particular system type and not included in the multiple default policies, and an assets folder that includes a set of files required for install and uninstall instructions are also defined along with the manifest file. In order to perform the compression, some embodiments first archive the manifest file, system-type logo, first policies folder, second policies folder, and assets folder (e.g., into a tarball), and then compress these archived files and folders to create the custom system template package (e.g., a gzipped tarball).

The manifest file, in some embodiments, is a YAML (yet another markup language) file and is the only file that is mandatory for creating the custom system template package. Conversely, the system type logo, the first policies folder, the second policies folder, and the assets folder are all optional, according to some embodiments. In some embodiments, the manifest file includes a policies portion, a datasources portion, a tokens portion, a discovery portion, a decision portion, a library portion, and a parameters portion.

The policies portion, in some embodiments, points to a subdirectory of a policies folder (e.g., the first and/or second policies folder) that specifies one or more policies for the particular system type. In some embodiments, the datasources portion defines an initial datasource configuration for the particular system type. The tokens portion defines one or more tokens for the particular system type, in some embodiments. The discovery portion, in some embodiments, specifies how the authorization service responds to discovery requests from the particular system type. In some embodiments, the decision portion includes decision mappings and significant fields (e.g., significant decision fields for logreplay) for the particular system type. The library portion, in some embodiments, provides hints (e.g., hints for the user interface (UI)) regarding policy libraries used by the particular system type. Lastly, the parameters portion specifies one or more sets of parameters for the particular system type, in some embodiments. Parameter values associated with parameters specified by the parameters portion, in some embodiments, are referenced by one or more policy files associated with the particular system type, such as the first and/or second policies files.

In some embodiments, after the custom system template package is uploaded to the authorization service, each file and folder in the gzipped tarball is rendered and validated. During the validation process, in some embodiments, package names and module paths are checked in each of the files. In some embodiments, rendering and validating the first and second policies folders includes scanning the folders to identify a particular set of files (e.g., Rego files), rendering contents and paths of the identified particular set of files, dropping any files in the particular set of files identified as empty files, and validating the remaining files in the set.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

FIG. 5 illustrates an example of a tokens portion of a manifest.yaml file in which a set of tokens are declared, in some embodiments.

FIG. 6 illustrates an example of an install command, in some embodiments.

FIG. 7 illustrates a list of available token scope names, in some embodiments.

FIG. 8 illustrates an example of a sample of the discovery portion of a manifest.yaml file, in some embodiments.

FIG. 13 illustrates a sample implementation of the GET command for obtaining a list of available system types, in some embodiments.

DETAILED DESCRIPTION

Figure 1:
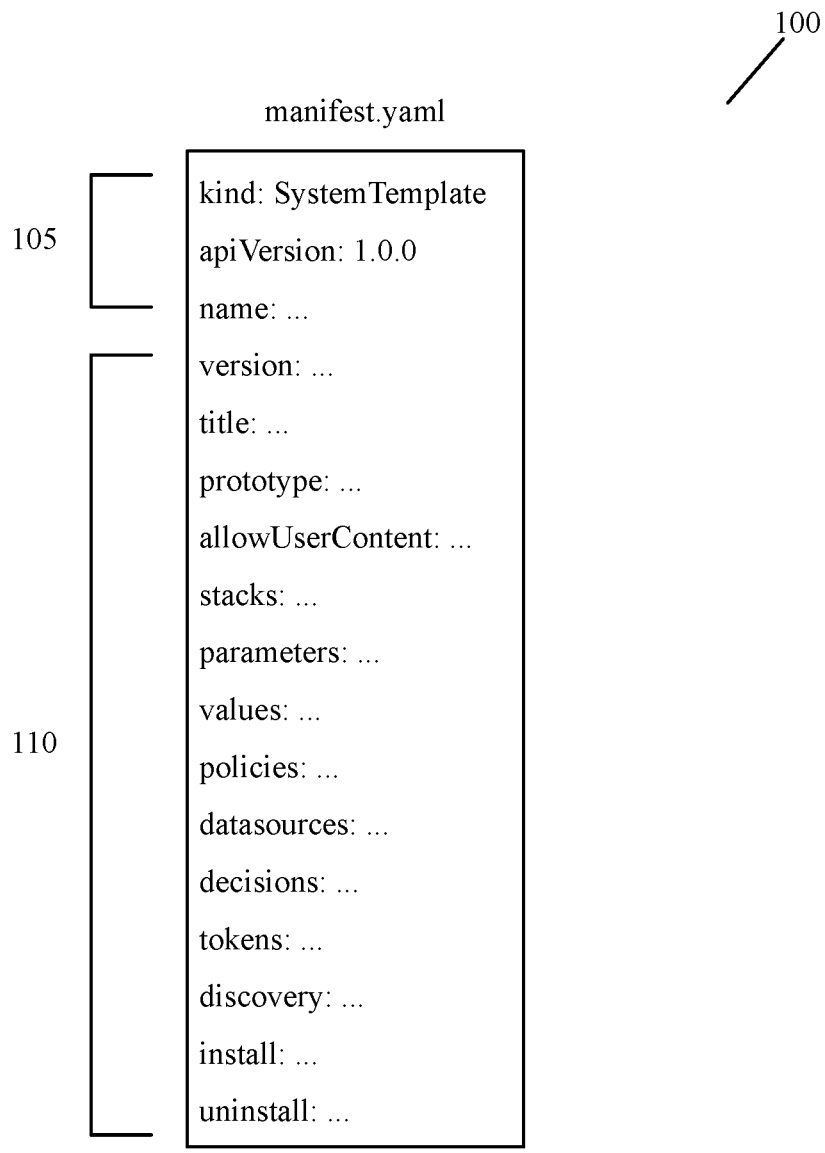
FIG. 1 illustrates an example structure of a manifest file, in some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide system type template packages format, and the API to manage them. System type template packages (also referred to herein as template packages) are archives that can be uploaded to an authorization service (e.g., Styra's declarative authorization service (DAS)) to define new system and stack types. Files in the template packages define initial scaffolding for systems of the new type. Examples of these files include system type metadata (name, description, version etc.), system/ stack rego policy templates, datasources that should be created, install/uninstall instructions, downloadable assets (i.e., for the installation/uninstallation commands), tokens required, discovery bundle options, system parameters that are required by the system or stack and can be used in all the templates, fields that are relevant when comparing decisions produced by the system (i.e., for logreplay), and policies used in rules for the system. The system types API, in some embodiments, specifies the endpoints to upload or delete such template packages, lists available system types and their parameters and metadata.

In some embodiments, system template packages enable system types to be defined that address authorization requirements of customers' applications, without reliance on catch-all generic custom types. These system types, in some embodiments, can have their own policy layouts and initial scaffolding for those policies, as well as other system aspects (e.g. installation instructions). Since template packages are external to the authorization service (e.g., Styra DAS), they can be developed on-premises, in some embodiments, with any IDE or editor outside of the user interface (UI), put into git repository, and can be shared with others, according to some embodiments. In some embodiments, templates can be used to capture common aspects of multiple systems in order to avoid repeating the same tasks with each new system created.

The solution for the problem described above consists of two parts. Namely, the format of the template packages, and the specification for the API that could handle such packages. Then, to define a new system type, a user only needs to upload the template package for that type using the aforementioned API.

Template packages, in some embodiments, are archived and compressed (e.g., GZipped tars) with a well-known file structure inside that includes predefined files and folder names at the top-level, while all other files are ignored and user-defined files are placed into appropriate subfolders. Altogether, these files define a new system type and the initial filling and configuration for the systems of that type, according to some embodiments. More specifically, in some embodiments, the package defines initial policies of the system, user input required by those policies, data sources that will be created for the system along with their configuration, initial set of tokens required, install and uninstall instructions for the system deployment, downloadable assets to be used to install or uninstall the system, discovery bundle settings, decision mappings, significant decision fields for the logreplay, and additional options for the system.

In some embodiments, the file structure for the tarball is as follows. The manifest.yaml file describes the properties of the system-type not captured in the files. The logo.svg is the logo used for the system-type, which will be described in further detail below. The policies/folder contains all of the Rego policies that are created by default when a new system/stack of this type is created. The policies/stacks folder contains the policies that are created by default when a new stack is created. To enable stacks for this template, the stacks must be set to true in the manifest. The typelib/folder contains Rego policies that are not copied into each new system/stack. Instead, there is one copy for all systems/ stacks (e.g. a policy library or the Rego rules for combining individual systems and stacks). Lastly, the assets/folder contains additional files that may be necessary for install/ uninstall instructions (e.g. the OPA configuration).

The files created, in some embodiments, require information about the environment, such as the system ID. For example, the file for configuring OPA must include in its label the ID of the system so that when OPA connects to DAS and requests its configuration, DAS knows which system this OPA is associated with, according to some embodiments. As a result, all of the files are treated as standard Go templates. In some embodiments, many fragments of the manifest.yaml file are also treated as Go templates. Specifically, the artifacts that are templates, in some embodiments, include all user-defined files unless explicitly configured otherwise, many of the fields in the manifest file, and file and folder names for the user-defined contents.

In addition to the standard text/template functions, additional essential functions should be available in the templates, according to some embodiments, and function names and usage must be compliant with that used by helm charts. In some embodiments, variables that are available in most templates include system/stack ID {{ID}}, system-type name{{Name} }, system-type version {{. Version} }, and tenant name {{. Tenant} }. It should be noted that tenant name typically should not be used, according to some embodiments.

In some embodiments, the manifest file is called manifest.yaml. FIG. 1 illustrates an example structure of a manifest file 100, in some embodiments. This file, in some embodiments, is located in the root of the tarball and is the only mandatory file. Much of the information that makes up a system-template is defined within the manifest file, according to some embodiments. The first three fields 105 of the file 100 are the only mandatory fields, while the remaining fields 110 are not mandatory. As a result, in some embodiments, the minimal system template package would consist of just one manifest.yaml file that specifies at least the kind, api Version, and name.

There are two version numbers that are essential to the template packages, in some embodiments. The first of the two version numbers is mandatory, in some embodiments, and is the api Versionattribute, while the second of the two version numbers is optional and is the version attribute. In some embodiments, both version numbers are Sem Ver 2.0 versions with 3 mandatory components: Major.Minor.Patch.

In some embodiments, api Version represents the expectations the template has on the API. As the package format evolves, in some embodiments, there will be packages designed for newer APIs than the user has (e.g. on-prem case). In some embodiments, api Version tells the minimum allowed APIversion. In this context, API means the code on the server that parses the template contents and puts semantics into various files and YAML attributes, according to some embodiments.

Each API, in some embodiments, has a list of the latest supported versions per each Major component (e.g. ["1.2.3", "2.1.5", "3.0.0"]). In some embodiments, change in the Major version component indicates breaking changes to the package format. The Minor component changes, in some embodiments, when a feature is added without breaking backward compatibility, and Patch is incremented with every bug fix that the package can potentially depend on. Since all API versions that share the same Major number are backward compatible, API tracks the best-known version for each Major supported, according to some embodiments. The package, in some embodiments, is only accepted by the API if the api Version major is in the list and version is less or equal than the version listed. In example above, API would accept 1.0.0, 2.1.0, 3.0.0 and reject 0.0.1, 2.1.6 and 4.0.0.

In some embodiments, the template's version is how the API compares an uploaded package to an existing package with the same name. Templates that differ by the Major version components are treated like two distinct system types, in some embodiments. When creating a new system, in some embodiments, the user is responsible for choosing the type version (i.e., as part of the type name), and there is just one "best" version per Major. However, for existing systems, when the package is needed (e.g. to recreate deleted policy) the API looks for the package with the same pair Major. Minor that was used to create the system, in some embodiments. Internally, in some embodiments, API indexes packages by Major. Minor such that if the uploaded package differs from the existing package by only the Patch level, the API will overwrite it.

In some embodiments, any template with version >=1.0.0 that is checked into fetchdb in the system-types folder will automatically be uploaded to all tenants. During development, the version should be <1.0.0, and templates should be manually uploaded for debugging to any desired tenants (e.g., test.styra.com), according to some embodiments. The API section shows the curl commands that can be used to upload templates.

Simple manifest fields, in some embodiments, are used to describe the system-template itself. In some embodiments, these fields include kind: SystemTemplate as a mandatory field for future-compatibility, apiVersion: 1.0.0 as the mandatory version (and currently the only version) of the System Template implementation, name: <system-type-name> as the name for this system-type (e.g. terraform or kuma), version: <major>.<minor>.<patch> as the version of the system-template, and title: <human-friendly-name> as the human-friendly name of the system type that is shown in the graphical user interface (GUI) when a user requests to create a new system. In some embodiments, if the title field is absent, the name value is used as the title. The version, in some embodiments, defaults to 0.0.0. Versioning will be described in further detail below. In some embodiments, API operations on system-templates use <name>:<version> to uniquely reference a system-template. The complete name for the system type is template.<name>:<major>.<minor>.

In some embodiments, there are additional options with simple descriptions. For example, when allowUserContent: <boolean> is true, the GUI allows the user to create a hierarchy of policies. Conversely, when allowUserContent: <boolean> is false, the user is only able to use the policies that are created in the system by default, according to some embodiments.

The values section of the manifest file is where essential constants or pre-computed values can be put, according to some embodiments. In some embodiments, values can be used to store TLS certificates, URLs, magic constants, or any other semi-static values shared by several files. Additionally, if some complex expression is used in several places, instead of repeating the complex expression each time, the value could be precomputed in the values section, in some embodiments, and subsequently referred to from multiple places. None of these values can take user-input, according to some embodiments. In some embodiments, values can only be of string type, and are treated as a template and rendered. Value template expressions may reference parameters, in some embodiments, but cannot reference other values. For instance, if two values "pi" and "myvalue" are defined as pi: "3.14159" and myvalue: "{{.Params.foo|b64enc} }", these values can be referenced from templates using {{Values.pi} } syntax.

Figure 2:
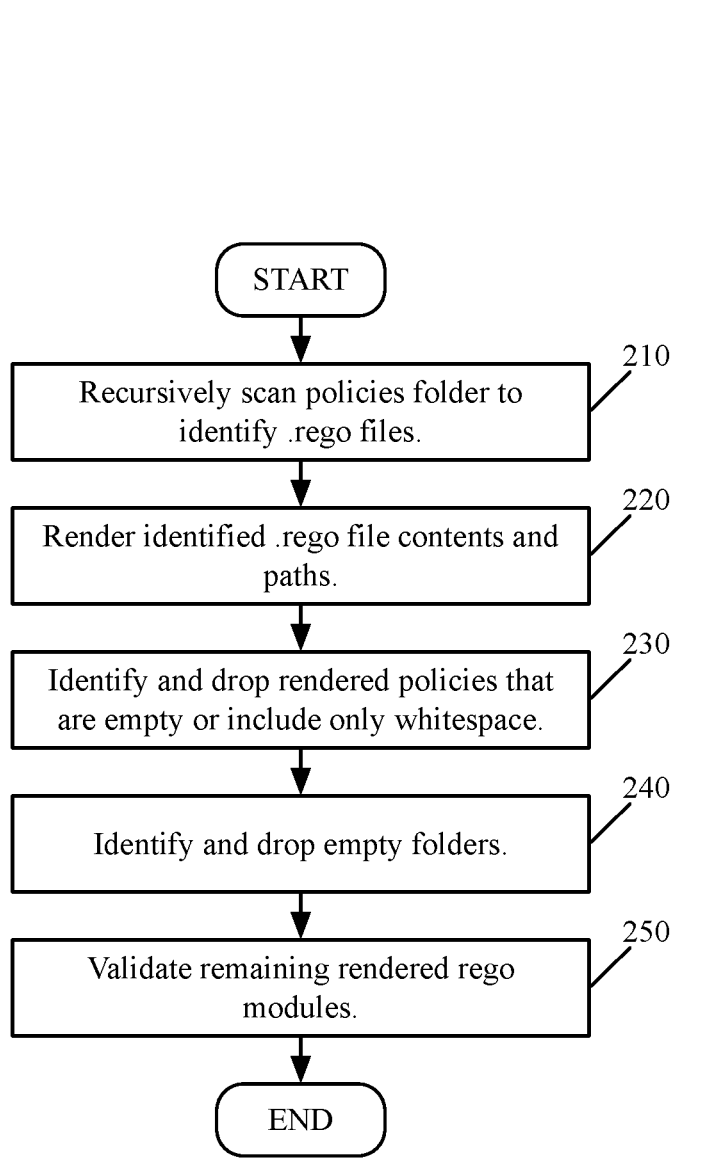
FIG. 2 illustrates a process (as of version 1.0.0) performed, in some embodiments, regarding the policies upon system initiation.

When a new system is created, in some embodiments, the policies that are created by default are all those under the policies/folder. Additionally, the manifest.yaml file contains (optional) metadata for each of those policies, in some embodiments. User policies, in some embodiments, are placed anywhere under the policies directory in the package root. FIG. 2 illustrates a process (as of version 1.0.0) performed, in some embodiments, regarding the policies upon system initiation.

The process starts by recursively scanning (at 210) a policies folder for * .rego files. During the scan, files with extensions other than .rego are ignored.

The process renders (at 220) the identified .rego file contents and paths. In some embodiments, this step is performed by a text/template engine. Failure to render any of the templates will result in failure to create the system, according to some embodiments. In some embodiments, after rendering both policy path and contents, policy package name must be reflected in the path. Because expressions are allowed in package names, and the policy path must reflect that, expressions are also allowed in the path, in some embodiments. In some embodiments, if the package name includes template actions, then the module path inside the package will have the same template actions.

Next, the process identifies and drops (at 230) any rendered policies that are either empty or include only whitespace. The process identifies and drops (at 240) any empty folders.

The process then validates (at 250) the remaining rego modules. In addition to being valid, the rego modules, in some embodiments, are required to have a package name that does not start with a global namespace prefix (e.g., global, library, stacks, results, etc.). In some embodiments, systems that have invalid rego modules cannot be created. Packages that have names prefixed with metadata (or metadata. {{ID} }, as discussed below) will be placed in the metadata namespace, in some embodiments, while all other packages will contribute to the system policy namespace. Following 250, the process 200 ends.

Figure 3:
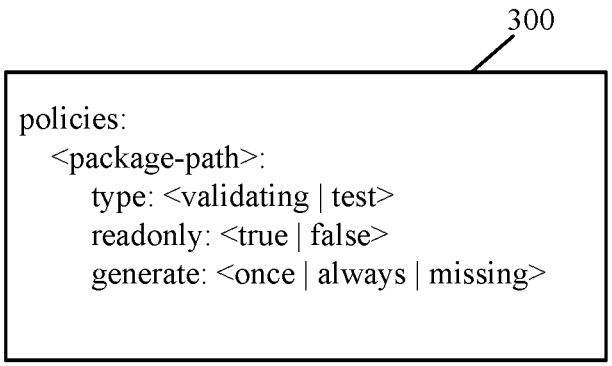
FIG. 3 illustrates an example of a policies section of a manifest file, in some embodiments.

FIG. 3 illustrates an example of a policies section of a manifest file, in some embodiments. The <package-path> of the policies section 300, in some embodiments, must point to a subdirectory of the policies folder, and also reflect the rego package name of the file at that path. In some embodiments, the policy type indicates to a user interface (UI) how to treat the policy. Known policy types, in some embodiments, include rules, test, labels, monitor, mask, features, selectors, and notifications. In case of complex policy type names, such as validation/test, the last portion (i.e., test in this example) indicates that this is a test policy package.

The generate field, in some embodiments, indicates when to create, or recreate, the policy. In some embodiments, this field must specify once, missing, or always. Policies that specify "once" in the generate field are to be created once when the system or stack is first created, according to some embodiments. The default for the generate field, in some embodiments, is "missing", which indicates that the policy should be created each time it is not found. Such policies can be edited, in some embodiments, and are recreated using the original template if deleted. In some embodiments, policies that specify "always" in the generate field are regenerated on each converger run. In some such embodiments, because it would be nonsensical to manually edit such policies, the readonly field is automatically marked with "true". To control default policies generated when a user creates a new stack instance, in some embodiments, Rego files must be put into the folder "policies/stacks".

In some embodiments, the <package-path> is treated as a template so that users can include entries for metadata and stack policies. If the package name is dynamic, then both the path and yaml key must contain templates (e.g., policies: metadata/{{ID} }/labels:). In this example, {{ID} } is not only the template, but also a folder name. Metadata policies, in some embodiments, are created automatically for the system. However, if they are defined in the manifest, they override the default behavior, in some embodiments. Additionally, in some embodiments, if the package is declared but not present in the policies folder, it will not be created.

Path and package declaration for policies in protected namespaces (i.e., metadata and stacks namespaces) are automatically patched to include system/stack ID if it's not already present, according to some embodiments. For example, a policy "package metadata.XYZ" in a "policies/metadata/XYZ" folder will automatically become package "metadata. {{.ID}}.XYZ" and "policies/metadata/{{ID} }/XYZ", according to some embodiments. Doing so not only simplifies policies and file structure, in some embodiments, but also guarantees isolation between policies of different systems/stacks.

It should be noted that the template syntax uses "{{" to indicate the start of a template variable. Additionally, "{{" is also valid Rego syntax. However, the templating engine, in some embodiments, throws an error when policies use "{{". In some embodiments, to work around this, a space can be added between the Rego braces, e.g., "{ {".

The policies described above appear in every system/stack that a user creates, according to some embodiments. In some embodiments, the user actually sees those policies and, for the most part, is able to modify those policies when inspecting the system/stack. Most system-types also need Rego policies that exist behind the scenes, according to some embodiments, such as policies that the user might be able to invoke, but that they cannot modify. Moreover, these policies are the same across all instances of the system-type, in some embodiments, and as such, it is ideal to avoid copying these policies into every system/stack instance. Instead, these kinds of policies can be created by adding them to the "typelib/" directory, in some embodiments.

In a first policy-type example, consider the logic that is used to combine a system's policies with stack policies. In some embodiments, adding that logic into the "typelib/" directory enables that logic to be extended to support a broader range of decisions to fix a bug in one place without having to change all systems/stacks across all tenants. In a second policy-type example, consider any policy library for a system-type. The Kubernetes system-type, for instance, has a policy library that provides a collection of pre-built rules, such as rejecting conflicting ingresses and ensuring all images come from a trusted registry. Likewise, Terraform has a policy library. Due to the large sizes of these libraries, it is preferable to avoid having to copy these policy libraries into every single system, in some embodiments. As such, these policies should be located in the "typelib/" folder.

In some embodiments, all files in the "typelib/" folder are loaded into a location that is unique for the system-type (including its version). The location in which those files are loaded, in some embodiments, is available through the template variable "{{.TypeLib} }". All of the Rego packages inside the folder are relative to the template variable "{{TypeLib} }", according to some embodiments. In some embodiments, "{{TypeLib} }" can be included explicitly in the Rego pathname, or it can be added by the system-templates API. As such, within the "typelib/" folder, "package foo" and "package {{TypeLib} }.foo" are equivalent.

Policies are rendered, in some embodiments, when the system-type is uploaded and deleted when system-type is deleted. The exact value of "{{TypeLib} }" is considered an implementation detail and templates should not rely on its contents, according to some embodiments. Because the files in the "typelib/" folder apply to all systems and stacks, those files have no access to type/deployment parameters or system/stack ID template variables, in some embodiments, but do have access to those that remain.

Figure 4:
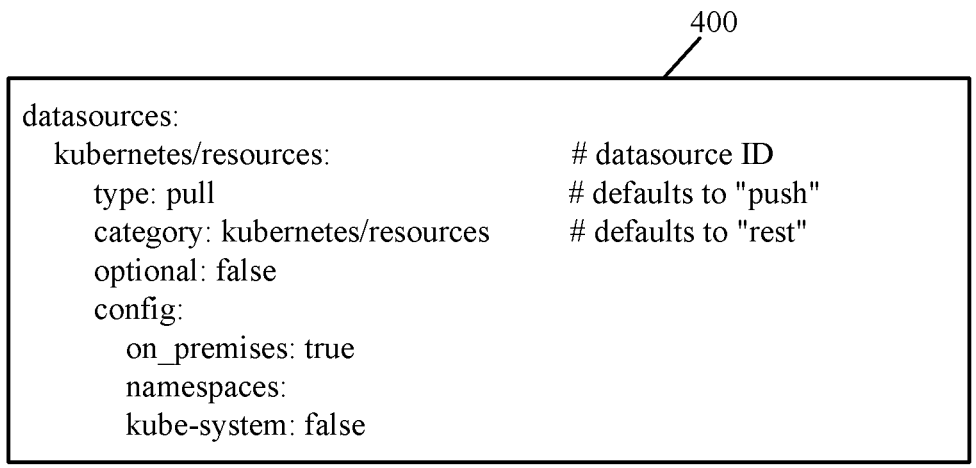
FIG. 4 illustrates an example of a datasources portion of a manifest.yaml file, in some embodiments.

FIG. 4 illustrates an example of a datasources portion of a manifest.yaml file, in some embodiments. The datasources portion 400, in some embodiments, defines the initial datasource configuration for the system. In some embodiments, all fields or this portion are optional.

The manifest.yaml file, in some embodiments, can specify tokens that the system may need for installation instructions, assets, or any of the templates. FIG. 5 illustrates an example of a tokens portion of a manifest.yaml file in which a set of tokens are declared, in some embodiments. In some embodiments, token values can be used in templates with a token function. For instance, the tokens portion 500 includes the {{token "installtoken"} } function 510, which is used for assets and install/uninstall instructions, in some embodiments. FIG. 6 illustrates an example of an install command 600, in some embodiments. Install and uninstall commands, in some embodiments, are defined through install and uninstall fields of identical format.

Returning to the tokens portion 500, in addition to the install token function 510, the tokens portion 500 also defines two tokens. As shown, the tokens portion 500 defines opatoken 520 and anothertoken 530. The opatoken 520 includes a description indicating this is a permanent token for OPA to contact DAS, has a time to live (TTL) of 87600 hours, and provides a set of scopes that include discovery, status, bundles, and logs. Additionally, the anothertoken 530 includes a description indicating this is a token with administrative rights, has a TTL of one (1) hour, and includes a default path of ".*". FIG. 7 illustrates a list of available token scope names 700, in some embodiments.

In some embodiments, assets are downloadable contents for a package and are placed in an assets subfolder of the package root. The URL to any asset may be obtained through the {{asset "path1"}} expression, in some embodiments, and path 1 must be a valid path relative to the assets folder. In some embodiments, when such a URL is retrieved, the asset file is rendered according to a set of rules. If the filename has .bin extension, its contents are taken as-is and the .bin extension is removed. If the .bin extension is not removed, the file is rendered as a text template. If the path points to a folder rather than a file, each file in that directory is rendered according to the two rules above, and they are all archived into one gzipped tarball.

In order to download its configuration from DAS, in some embodiments, OPA uses the Discovery protocol. In some embodiments, the discovery section of the manifest file can be used to control how the DAS responds to discovery requests for systems of this type. FIG. 8 illustrates an example of a sample of the discovery portion of a manifest.yaml file, in some embodiments. In some embodiments, all of the attributes in the discovery portion 800 are optional. If defaultRule is present, it must specify a full default rule path including the package name (e.g., rules/validating/my_rule), according to some embodiments.

Figure 9:
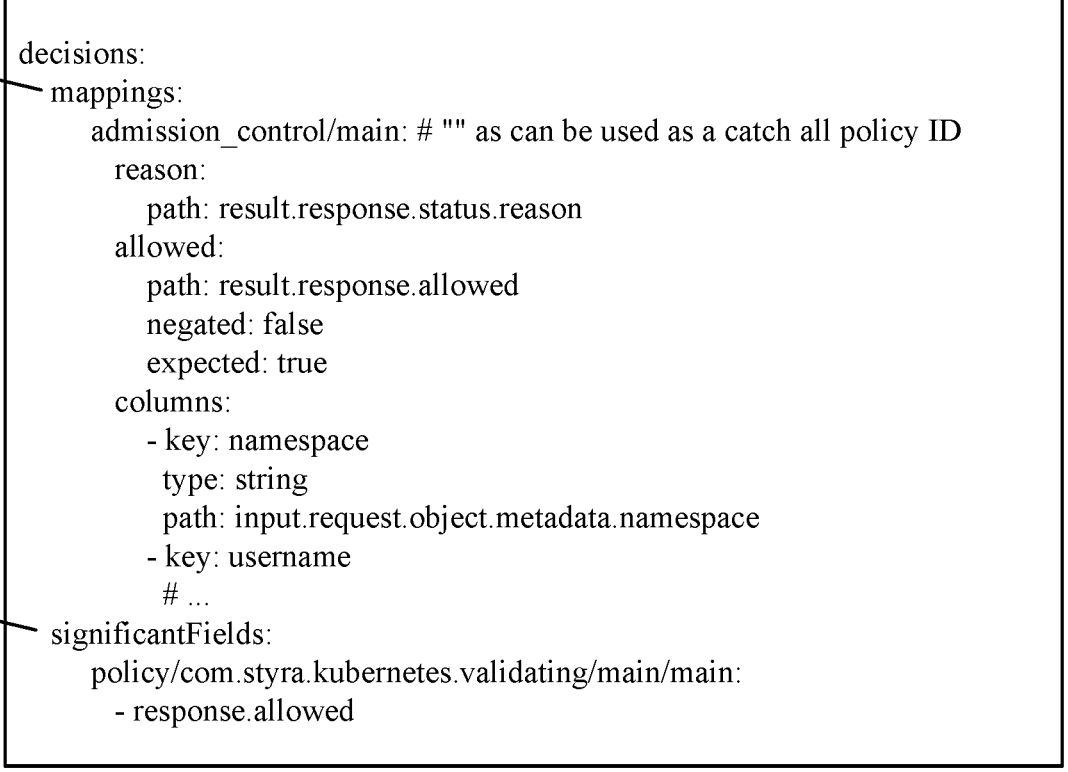
FIG. 9 illustrates an example of the decision portion of a manifest.yaml file, in some embodiments.

In some embodiments, default decision mappings and significant fields for the system can be defined in the decisions section of the manifest file. FIG. 9 illustrates an example of the decision portion of a manifest.yaml file, in some embodiments. As shown, the decision portion 900 includes decision mappings 910 and significant fields 920.

Figure 10:
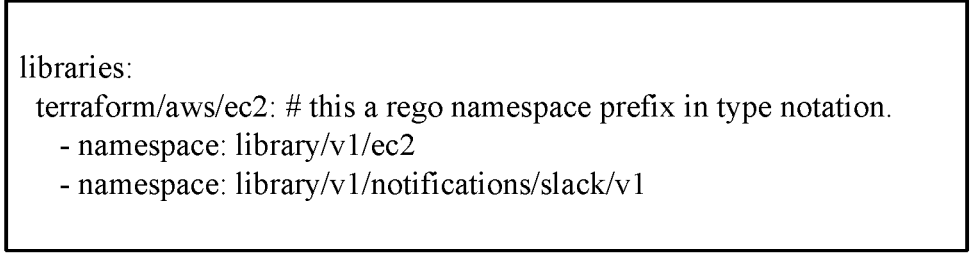
FIG. 10 illustrates an example of a libraries portion of a manifest.yaml file, in some embodiments.

The libraries portion of a manifest.yaml file, in some embodiments, provides the UI with hints on what policy libraries are used by the packages. In particular, the libraries portion can be used to display the right list of snippets for each package type, in some embodiments. FIG. 10 illustrates an example of a libraries portion of a manifest.yaml file, in some embodiments. As shown, the libraries portion 1000 includes a Rego namespace prefix 1010.

In some embodiments, it is possible for a system template to provide logo to be used in the UI for systems and stacks of that type. For this to occur, a logo.png file, a logo.svg file, a logo.gif file, a logo.jpeg file, or a logo.jpg file must be placed in the package root folder, according to some embodiments. If such a file exists, in some embodiments, logo will be returned as part of the /v1/system-types response object in the Data URL format:
{
"logo": "data:image/png;base64, . . . ="
}

System types that specify "stacks: true" in their manifest can be used as stack types too, according to some embodiments. Once a system-template author has enabled "stacks: true", in some embodiments, certain information must be provided in the tarball. Any policies that are to appear within a new stack inside the folder "policies/stacks" must be created, in some embodiments. When a user creates a new system, in some embodiments, any other policy in that folder is ignored. In some embodiments, unless overridden, each stack automatically gets selectors, system/log, and notifications policies. A main policy that defines how to combine stack policies with the current system must also be created within the policies folder, in some embodiments. While conventional, in some embodiments, the main policy file does not need to be named "main". However, the file should be set to "readonly: true" and "generate: always" within the manifest.yaml file, according to some embodiments.

Figure 11:
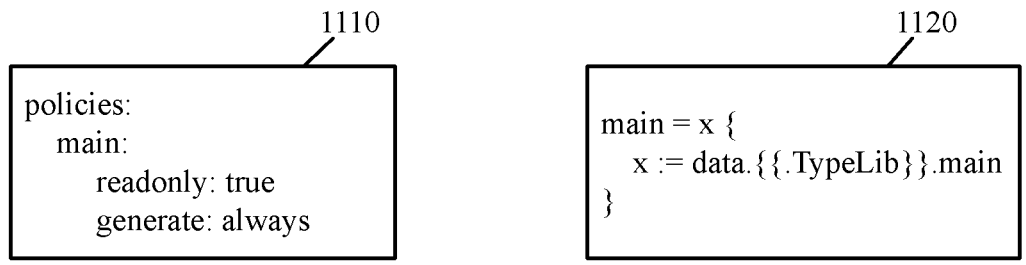
FIG. 11 illustrates such an example of a main policy, as well as how the file for said policy is included in the tarball, in some embodiments.

FIG. 11 illustrates such an example of a main policy, as well as how the file for said policy is included in the tarball, in some embodiments. As shown, the main policy file 1110 has readonly set to true, and has generate set to always in accordance with the parameters described above. Additionally, the file policies/main/main.rego is included in the tarball 1120. It should be noted that this main file is simply a pointer to another file within the {{TypeLib}} namespace. In some embodiments, this level of indirection is valuable as it enables users to update the logic at a later time without having to change all of the instances of this system type. This is because the main file itself gets copied into every instance of this system-type, in some embodiments, as discussed above. In contrast, the TypeLib has only one copy for all instances of the system-type. As the TypeLib is not user-facing, it is not stored in user git-repositories. The TypeLib will be discussed in more detail further below.

In some embodiments, Rego policies within the policies/stacks folder have access to stacks parameters, values, and predefined template variables like {{ID}}. Additionally, the Rego policies, in some embodiments, can make use of {{.Systems}} template value that is populated with a list of systems that are currently selectable with stack selector. In some embodiments, each system includes an ID field, a name field, an ExternalID field, a description field, and a type field.

Figure 12:
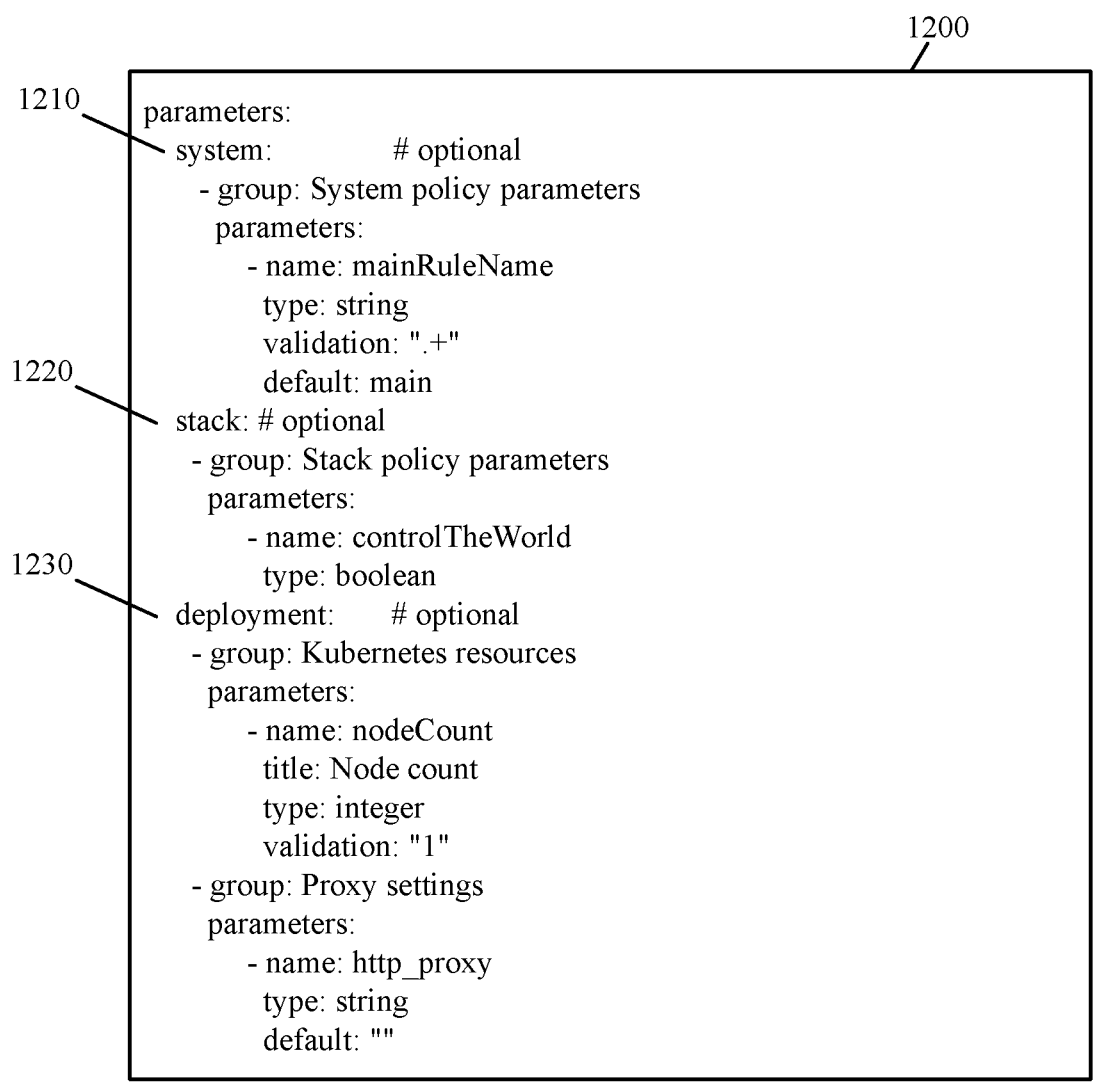
FIG. 12 illustrates an example of a parameters portion of a manifest.yaml file, in some embodiments.

Parameters are the values that the user provides when creating a new system or stack. Those values, in some embodiments, can be referenced from policy and other template files. In some embodiments, parameters are always string values and can be either optional or mandatory. FIG. 12 illustrates an example of a parameters portion of a manifest.yaml file, in some embodiments. As shown, parameters are defined through parameters portion 1200.

In some embodiments, there are three categories of parameters including system parameters 1210, stack parameters 1220, and deployment parameters 1230. The system parameters 1210, in some embodiments, are parameters that are supplied when a new system is created. In some embodiments, these parameter values can be used in Rego templates. Similarly, the stack parameters 1220 are also supplied when a new system is created and can be used in Rego templates, according to some embodiments. The deployment parameters 1230 are used, in some embodiments, for system assets and install/uninstall instructions in addition to the system parameters 1210. In some embodiments, deployment parameters can be set after the system has been created. Changes to the deployment parameters 1230, in some embodiments, implies that the system must be redeployed.

In each category, parameters are grouped with each group having a title and list of parameters belonging to the group, according to some embodiments. For each parameter, in some embodiments, only the name field is mandatory. In some embodiments, parameters that don't have a default must be provided when creating a system, while parameters that do have a default are considered to be optional. When a system is created, in some embodiments, all parameter values are taken from the type_parameters field of the system/stack configuration. In some embodiments, the values must be provided either in native JSON format or as a string. Data type, for example, must be provided as a string.

In some embodiments, the semantics of the validation field depends on the type. For strings, in some embodiments, it is the regular expression that is used to validate the value. For integer and float types, it has a form of min, max (e.g. 1,10 ([1 . . . 10])), in some embodiments. In some embodiments, both min and max are optional (e.g., 1 (>=1) or, 10 (<=10)). For other types, there can be no validation, according to some embodiments. System and stack parameters 1210 and 1220, in some embodiments, can be referenced from templates with the .Params prefix, such as {{.Params.controlTheWorld}}. In some embodiments, deployment parameters 1230 are accessed with the .Deployment prefix, such as {{.Deployment.http_proxy}}.

A template type, in some embodiments, can inherit aspects of another system type by putting it into the prototype field "prototype: kubernetes:v2". In some embodiments, by doing so, the system type inherits compliance validation, rules suggestions, system checker, and any missing aspect of the type (e.g., policies, datasources, tokens, install/uninstall, settings, etc.). In some such embodiments, the system type only inherits these aspects if the corresponding section is entirely missing in the manifest. In the case of policy files, there must be no such files in addition to the manifest section, according to some embodiments. In some embodiments, the prototype specifies system type name rather than a package. When inheriting aspects from another template, in some embodiments, the name must be of a form "template:another-template-name:3.2.1", and that package must exist in order to create a system.

In some embodiments, with the introduction of the system template packages, system type becomes an entity of its own and therefore requires an API to work with. Sample concrete commands can be utilized, in some embodiments, to identify, view, create, and delete system types. In some embodiments, such commands can include a command for downloading a package content tarball, a command for creating a system type, a command for deleting a system type, and a command to change an API.

The command for downloading a package content tarball, in some embodiments, is GET /v1/system-types/{typeId}?package. For built-in types that do not have packages, the HTTP 204 No Content code must be returned, according to some embodiments. In some embodiments, to create a system type, the command POST/v1/system-types can be used with the package archive as a body. If the package with the same Major. Minor version components already exists, in some embodiments, it will be overwritten unless the "If-None-Match: *" header is sent. To delete a system type, the DELETE/v1/system-types/{typeId} command can be used (e.g., DELETE /v1/system-types/template.packageId:1.2). In some embodiments, only the template types can be deleted, and only if there are no systems that exist for that type. Lastly, to make changes to the /v1/systems API, in some embodiments, requested parameter values must be placed in the new type_parameters object that must be added to the system configuration when creating a system.

FIG. 13 illustrates a sample implementation of the GET command for obtaining a list of available system types, in some embodiments. As shown, each of the system types returned as results in the sample 1300 include various attributes, such as name, version, title, parameters, stacks, whether user content is allowed, etc. In some embodiments, the parameters available for queries include all, which includes hidden types in the output, and stacks, which limits the output list to types that support stacks.

In some embodiments, the backend impacts of the above embodiments include that system types plugins need to be made more flexible (e.g., by having context pass end error return everywhere), that the template system type must be written, and that/v1/system-types API must be written. The frontend impacts, in some embodiments, include that the UI must ask for parameter values in the system creation dialog and validate them.

While there are no direct security implications, certain precautions should be taken, according to some embodiments. For instance, in some embodiments, maximum package size must be configurable with the feature flag, all template rendering and validating must be done synchronously when creating a system during an allocated 30 second timeout, and all rendered Rego policies and JSON/YAML files must be validated. In some embodiments, the validation of the JSON/YAML files includes checks for package names and module paths.

In some embodiments, a performance impact is experienced. For example, in some embodiments, it will take longer to create a template system compared to other system types because there is more work to be done. Implications on a system's converger performance may also be present in some embodiments. However, such implications will not be noticeable to users, according to some embodiments. Additionally, in some embodiments, there are no impacts to the platform.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 14:
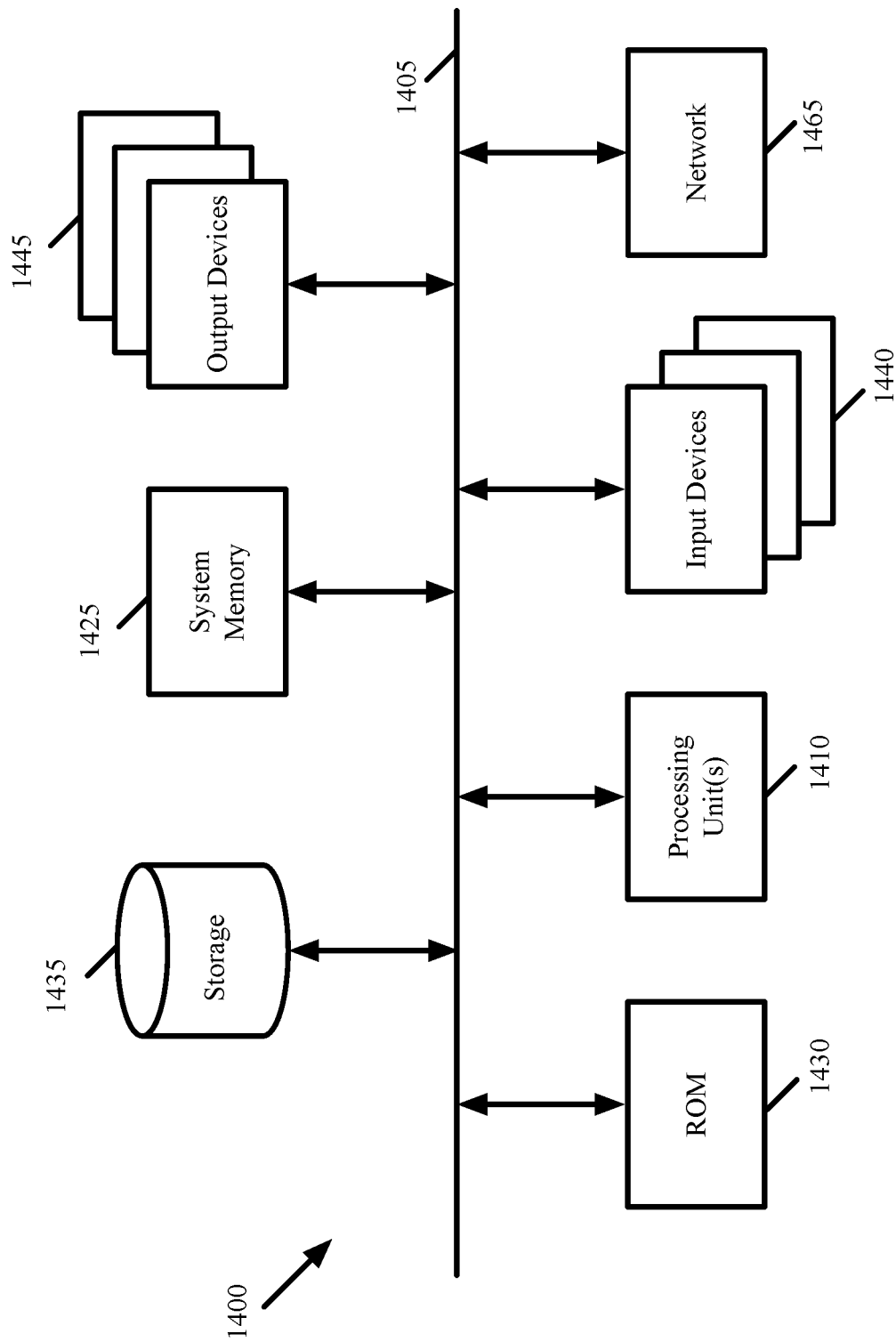
FIG. 14 conceptually illustrates a computer system with which some embodiments of the invention are implemented.

FIG. 14 conceptually illustrates a computer system 1400 with which some embodiments of the invention are implemented. The computer system 1400 can be used to implement any of the above-described hosts, controllers, gateway, and edge forwarding elements. As such, it can be used to execute any of the above described processes. This computer system 1400 includes various types of non-transitory machine-readable media and interfaces for various other types of machine-readable media. Computer system 1400 includes a bus 1405, processing unit(s) 1410, a system memory 1425, a read-only memory 1430, a permanent storage device 1435, input devices 1440, and output devices 1445.

The bus 1405 collectively represents all system, peripheral, and chipset buses that communicatively connect the numerous internal devices of the computer system 1400. For instance, the bus 1405 communicatively connects the processing unit(s) 1410 with the read-only memory 1430, the system memory 1425, and the permanent storage device 1435.

From these various memory units, the processing unit(s) 1410 retrieve instructions to execute and data to process in order to execute the processes of the invention. The processing unit(s) 1410 may be a single processor or a multicore processor in different embodiments. The read-only-memory (ROM) 1430 stores static data and instructions that are needed by the processing unit(s) 1410 and other modules of the computer system 1400. The permanent storage device 1435, on the other hand, is a read-and-write memory device. This device 1435 is a non-volatile memory unit that stores instructions and data even when the computer system 1400 is off. Some embodiments of the invention use a mass-storage device (such as a magnetic or optical disk and its corresponding disk drive) as the permanent storage device 1435.

Other embodiments use a removable storage device (such as a floppy disk, flash drive, etc.) as the permanent storage device. Like the permanent storage device 1435, the system memory 1425 is a read-and-write memory device. However, unlike storage device 1435, the system memory 1425 is a volatile read-and-write memory, such as random access memory. The system memory 1425 stores some of the instructions and data that the processor needs at runtime. In some embodiments, the invention's processes are stored in the system memory 1425, the permanent storage device 1435, and/or the read-only memory 1430. From these various memory units, the processing unit(s) 1410 retrieve instructions to execute and data to process in order to execute the processes of some embodiments.

The bus 1405 also connects to the input and output devices 1440 and 1445. The input devices 1440 enable the user to communicate information and select commands to the computer system 1400. The input devices 1440 include alphanumeric keyboards and pointing devices (also called "cursor control devices"). The output devices 1445 display images generated by the computer system 1400. The output devices 1445 include printers and display devices, such as cathode ray tubes (CRT) or liquid crystal displays (LCD). Some embodiments include devices such as touchscreens that function as both input and output devices 1440 and 1445.

Finally, as shown in FIG. 14, bus 1405 also couples computer system 1400 to a network 1465 through a network adapter (not shown). In this manner, the computer 1400 can be a part of a network of computers (such as a local area network ("LAN"), a wide area network ("WAN"), or an Intranet), or a network of networks (such as the Internet). Any or all components of computer system 1400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method for generating custom system templates to define new system types, the method comprising:
    for a particular system type, defining at least a manifest file that specifies a set of properties of the particular system type;
    compressing the defined manifest file to create a custom system template package for the particular system type; and
    uploading the custom system template package to an authorization service in order to instantiate a new system of the particular system type; and
    before compressing the defined manifest file, defining (i) a system-type logo associated with the particular system type, (ii) a first policies folder comprising a plurality of default policies associated with the particular system type, (iii) a second policies folder comprising a plurality of policies specified for the particular system type and not included in the plurality of default policies, and (iv) an assets folder comprising a set of files required for install and uninstall instructions.

2. The method of claim 1, wherein the second policies folder comprises logic that is used to combine policies for the particular system type with one or more stack policies.

3. The method of claim 1, wherein:
    the manifest file is mandatory to create the custom system template package; and
    the system type logo, the first policies folder, the second policies folder, and the assets folder are not mandatory to create the custom system template package.

4. The method of claim 1, wherein compressing the defined manifest file further comprises:
- archiving the manifest file, system-type logo, first policies folder, second policies folder, and assets folder; and
- compressing the archived manifest file, system-type logo, first policies folder, second policies folder, and assets folder to create the custom system template package.

5. The method of claim 4 further comprising rendering and validating each file and folder in the compressed, archived custom system template package.

6. The method of claim 5, wherein rendering and validating the first and second policies folders comprises:
- scanning the first and second policies folders to identify a particular set of files;
- rendering contents and paths of the identified particular set of files;
- dropping one or more files in the particular set of files identified as empty files; and
- validating remaining files in the particular set of files.

7. The method of claim 6, wherein the second policies folder comprises Rego policies defined for the particular system type.

8. The method of claim 1, wherein the manifest file is a YAML (yet another markup language) file.

9. A method for generating custom system templates to define new system types, the method comprising:
- for a particular system type, defining at least a manifest file that specifies a set of properties of the particular system type, wherein the manifest file comprises (i) a policies portion that points to a subdirectory of a policies folder that specifies one or more policies for the particular system type, (ii) a datasources portion that defines an initial datasource configuration for the particular system type, (iii) a tokens portion that defines one or more application programming interface (API) tokens for the particular system type, (iv) a discovery portion that specifies how the authorization service responds to discovery requests from the particular system type, (v) a decision portion that includes decision mappings and significant fields for the particular system type, (vi) a library portion that provides hints regarding policy libraries used by the particular system type, and (vii) a parameters portion that specifies one or more sets of parameters for the particular system type;
- compressing the defined manifest file to create a custom system template package for the particular system type; and
- uploading the custom system template package to an authorization service in order to instantiate a new system of the particular system type.

10. The method of claim 9, wherein one or more values associated with parameters specified by the parameters portion are referenced by one or more policy files associated with the particular system type.

11. A non-transitory machine readable medium storing a program which when executed by a set of processing units generates custom system templates to define new system types, the program comprising sets of instructions for:
- defining, for a particular system type, at least a manifest file that specifies a set of properties of the particular system type;
- compressing the defined manifest file to create a custom system template package for the particular system type; and
- uploading the custom system template package to an authorization service in order to instantiate a new system of the particular system type; and before compressing the defined manifest file, defining (i) a system-type logo associated with the particular system type, (ii) a first policies folder comprising a plurality of default policies associated with the particular system type, (iii) a second policies folder comprising a plurality of policies specified for the particular system type and not included in the plurality of default policies, and (iv) an assets folder comprising a set of files required for install and uninstall instructions.

12. The non-transitory machine readable medium of claim 11, wherein the second policies folder comprises logic that is used to combine policies for the particular system type with one or more stack policies.

13. The non-transitory machine readable medium of claim 11, wherein:
- the manifest file is mandatory to create the custom system template package; and
- the system type logo, the first policies folder, the second policies folder, and the assets folder are not mandatory to create the custom system template package.

14. The non-transitory machine readable medium of claim 11, wherein the set of instructions for compressing the defined manifest file further comprises sets of instructions for:
- archiving the manifest file, system-type logo, first policies folder, second policies folder, and assets folder; and
- compressing the archived manifest file, system-type logo, first policies folder, second policies folder, and assets folder to create the custom system template package.

15. The non-transitory machine readable medium of claim 14, wherein the set of instructions for compressing the defined manifest file further comprises a set of instructions for rendering and validating each file and folder in the compressed, archived custom system template package.

16. The non-transitory machine readable medium of claim 15, wherein the second policies folder comprises Rego policies defined for the particular system type, wherein the set of instructions for rendering and validating the first and second policies folders comprises sets of instructions for:
- scanning the first and second policies folders to identify a particular set of files;
- rendering contents and paths of the identified particular set of files;
- dropping one or more files in the particular set of files identified as empty files; and
- validating remaining files in the particular set of files.

17. The non-transitory machine readable medium of claim 11, wherein the manifest file comprises (i) a policies portion that points to a subdirectory of a policies folder that specifies one or more policies for the particular system type, (ii) a datasources portion that defines an initial datasource configuration for the particular system type, (iii) a tokens portion that defines one or more application programming interface (API) tokens for the particular system type, (iv) a discovery portion that specifies how the authorization service responds to discovery requests from the particular system type, (v) a decision portion that includes decision mappings and significant fields for the particular system type, (vi) a library portion that provides hints regarding policy libraries used by the particular system type, and (vii) a parameters portion that specifies one or more sets of parameters for the particular system type.

18. The non-transitory machine readable medium of claim 17, wherein one or more values associated with parameters specified by the parameters portion are referenced by one or more policy files associated with the particular system type.

* * * * *